US011049523B1

(12) United States Patent
Puri et al.

(10) Patent No.: US 11,049,523 B1
(45) Date of Patent: Jun. 29, 2021

(54) SYSTEM AND METHOD FOR PERFORMING REAL TIME, DYNAMIC AND ADAPTIVE SEGMENTATION OF VIDEO CONTENT FOR DISPLAY ON DIGITAL MEDIA CHANNELS

(71) Applicant: Smile Internet Technologies Private Limited, Gurugram (IN)

(72) Inventors: Siddharth Puri, Noida (IN); Vaibhav Pandey, Delhi (IN); Arpit Goel, Delhi (IN); Daman Arora, Jalandhar (IN)

(73) Assignee: Smile Internet Technologies Private Limited, Gurugram (IN)

( * ) Notice: Subject to any disclaimer, the term of this patent is extended or adjusted under 35 U.S.C. 154(b) by 0 days.

(21) Appl. No.: 17/008,414

(22) Filed: Aug. 31, 2020

(51) Int. Cl.
| | |
|---|---|
| *G11B 27/06* | (2006.01) |
| *G06K 9/00* | (2006.01) |
| *G06K 9/62* | (2006.01) |
| *H04N 21/845* | (2011.01) |
| *H04N 21/234* | (2011.01) |
| *H04N 21/854* | (2011.01) |

(52) U.S. Cl.
CPC .......... *G11B 27/06* (2013.01); *G06K 9/00677* (2013.01); *G06K 9/00765* (2013.01); *G06K 9/6256* (2013.01); *H04N 21/23418* (2013.01); *H04N 21/8456* (2013.01); *H04N 21/85406* (2013.01)

(58) Field of Classification Search
CPC .............. G11B 27/06; G06K 9/00677; G06K 9/00765; G06K 9/6256; H04N 21/23418; H04N 21/8456; H04N 21/85406
See application file for complete search history.

(56) References Cited

U.S. PATENT DOCUMENTS

| | | | | |
|---|---|---|---|---|
| 9,247,020 | B2 * | 1/2016 | Dollard | G06Q 30/0251 |
| 2018/0210954 | A1 * | 7/2018 | Guegan | G06F 16/3331 |
| 2020/0162796 | A1 * | 5/2020 | Azuolas | H04N 21/23439 |

* cited by examiner

*Primary Examiner* — Mishawn N. Hunter
(74) *Attorney, Agent, or Firm* — Kolisch Hartwell, P.C.

(57) ABSTRACT

The present disclosure provides a video segmentation system to create one or more segments of one or more content for one or more social media channel. The video segmentation system receives one or more content in one or more input formats. In addition, the video segmentation system segments the one or more content in the one or more segments based on plurality of parameters. Further, the video segmentation system ranks the one or more segments based on the segmentation of one or more content. Furthermore, the video segmentation system merges the one or more segments with highest ranking to produce an output content. Moreover, the video segmentation system displays the output content on one or more social media channel.

20 Claims, 3 Drawing Sheets

SYSTEM AND METHOD FOR PERFORMING REAL TIME, DYNAMIC AND ADAPTIVE SEGMENTATION OF VIDEO CONTENT FOR DISPLAY ON DIGITAL MEDIA CHANNELS

TECHNICAL FIELD

The present invention relates to a field of online video streaming. More particularly, the present disclosure relates to a system for enabling segmentation of video content for display on various social media platforms.

INTRODUCTION

With the advancement of online multimedia revolution along with sudden rise in network bandwidth in recent years, the popularity of online content on video on-demand platforms has gained momentum. These online video on-demand platforms provide a plethora of online streaming services. The online streaming services include television news, sports shows, television shows, non-televised shows, interviews, location specific events, national events, international events, movies and the like. Nowadays, there are many platforms that provide content streaming services on demand. With the advancement of online multimedia, there is an advancement in business and marketing. Conventionally, online content developers create the content and appoint an administrator team that uses a video segmentation system to publish the content over social media channels. The rules for publication of the content on different social media channels are different. The different rules include orientation, aspect ratio and duration. Moreover, this process is done manually and consumes a lot of time. Furthermore, this process requires manpower and capita as well.

In the enlightenment of the above problem, there is a need of creating a system that is completely automatic. Thus, there is a need to create a system that can save time and money. The invention provides such new and useful methods for compiling online content for one or more social media channel.

SUMMARY

In a first example, a computer-implemented method is provided. The computer-implemented method for creating one or more segments of one or more content for one or more social media channel in real time. The method includes a first step to receive one or more video based content in one or more input formats at a video segmentation system with a processor. In addition, the method includes a second step to analyze the one or more video based content in one or more video segments in real time at the video segmentation system with the processor. Further, the method includes a third step to segment the one or more video based content in one or more video segments in real time at the video segmentation system with the processor. Furthermore, the method includes a fourth step to rank the one or more video segments in real time at the video segmentation system with the processor. Moreover, the method includes a fifth step to merge the one or more segments with highest ranking to produce an output content at the video segmentation system with the processor. The one or more video based content is received from the one or more content source using one or more input devices in real-time. The one or more parameters include audio continuity, video continuity and an intersection of audio continuity and video continuity. The one or more video based content is segmented into the one or more video segments based on one or more parameters. The ranking of the one or more segments is based on segmentation of the one or more video based content. The ranking is adaptive in nature. The one or more segments are merged based on one or more requirements of one or more social media channel. The output content is merged to display on the one or more social media channel.

In an embodiment of the present disclosure, the one or more input formats include at least one of text, audio, video, animation and GIF.

In an embodiment of the present disclosure, the one or more input devices include at least one of keyboard, mouse, scanner, digital camera, microphone, digitizer and a joystick.

In an embodiment of the present disclosure, the segmentation of the one or more segments is performed based on one or more algorithms. In addition, the one or more algorithms include at least one of an artificial intelligence algorithm and a machine learning algorithm.

In an embodiment of the present disclosure, the ranking of the one or more segments is based on the one or more parameters. In addition, the one or more parameters include the audio continuity, the video continuity and the intersection of the audio continuity and video continuity.

In an embodiment of the present disclosure, the audio continuity refers to checking of continuity in an audio content present in the one or more segments.

In an embodiment of the present disclosure, the video continuity refers to checking of continuity in a video content present in the one or more segments.

In an embodiment of the present disclosure, the intersection of the audio continuity and the video continuity refers to seamless intersection of an audio content with respective video content. In addition, the audio content and the respective video content is present in the one or more segments.

In an embodiment of the present disclosure, the one or more requirements of the one or more social media channel include at least one of an aspect ratio of the output content, an orientation of the output content and a duration of the output content.

In an embodiment of the present disclosure, the output content is displayed on the one or more social media channel. In addition, the output content is displayed on the one or more social media channel for marketing purpose.

In a second example, a computer system is provided. The computer system includes one or more processors, and a memory. The memory is coupled to the one or more processors. The memory stores instructions. The memory is executed by the one or more processors. The execution of the memory causes the one or more processors to perform a method for creating one or more segments of one or more content for one or more social media channel in real time. The method includes a first step to receive one or more video based content in one or more input formats at a video segmentation system. In addition, the method includes a second step to analyze the one or more video based content in one or more video segments in real time at the video segmentation system. Further, the method includes a third step to segment the one or more video based content in one or more video segments in real time at the video segmentation system. Furthermore, the method includes a fourth step to rank the one or more video segments in real time at the video segmentation system. Moreover, the method includes a fifth step to merge the one or more segments with highest ranking to produce an output content at the video segmentation system. The one or more video based content is received from the one or more content source using one or more input devices in real-time. The one or more parameters include audio continuity, video continuity and an intersection of audio continuity and video continuity. The one or more video based content is segmented into the one or more video segments based on one or more parameters. The ranking of the one or more segments is based on segmentation of the one or more video based content. The ranking is adaptive in nature. The one or more segments are merged based on one or more requirements of one or more social media channel. The output content is merged to display on the one or more social media channel.

In a third example, a non-transitory computer-readable storage medium is provided. The non-transitory computer-readable storage medium encodes computer executable instructions. The computer executable instructions are executed by at least one processor to perform a method for creating one or more segments of one or more content for one or more social media channel in real time. The method includes a first step to receive one or more video based content in one or more input formats at a computing device. In addition, the method includes a second step to analyze the one or more video based content in one or more video segments in real time at the computing device. Further, the method includes a third step to segment the one or more video based content in one or more video segments in real time at the computing device. Furthermore, the method includes a fourth step to rank the one or more video segments in real time at the computing device. Moreover, the method includes a fifth step to merge the one or more segments with highest ranking to produce an output content at the computing device. The one or more video based content is received from the one or more content source using one or more input devices in real-time. The one or more parameters include audio continuity, video continuity and an intersection of audio continuity and video continuity. The one or more video based content is segmented into the one or more video segments based on one or more parameters. The ranking of the one or more segments is based on segmentation of the one or more video based content. The ranking is adaptive in nature. The one or more segments are merged based on one or more requirements of one or more social media channel. The output content is merged to display on the one or more social media channel.

BRIEF DESCRIPTION OF THE DRAWINGS

Having thus described the invention in general terms, reference will now be made to the accompanying drawings, which are not necessarily drawn to scale, and wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
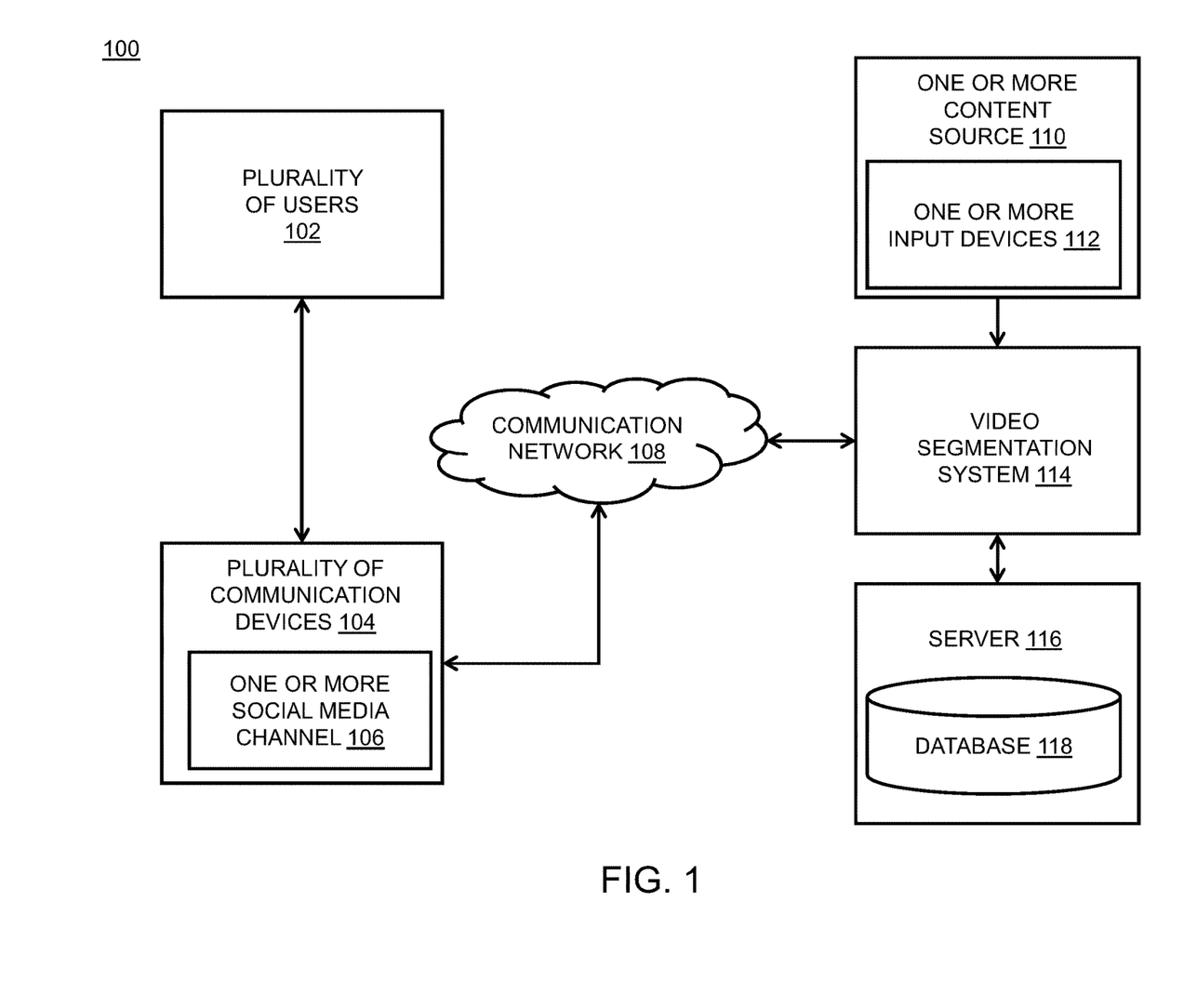
FIG. 1 illustrates a general overview of an interactive computing environment for content segmentation, in accordance with various embodiments of the present disclosure.

FIG. 1 illustrates a general overview of an interactive computing environment 100 for content segmentation, in accordance with various embodiments of the present disclosure. The interactive computing environment 100 includes a plurality of users 102, a plurality of communication devices 104, one or more social media channel 106, a communication network 108, one or more content source 110, one or more input devices 112, a video segmentation system 114, a server 116 and a database 118.

The interactive computing environment 100 includes the plurality of users 102. The plurality of users 102 are persons that have ability to access the plurality of communication devices 104 in real time. In an embodiment of the present disclosure, the plurality of users 102 are currently performing one or more tasks on the plurality of communication devices 104 based on choice of interest. In another embodiment of the present disclosure, the plurality of users 102 have ability to maintain and troubleshoot the plurality of communication devices 104. In addition, the plurality of users 102 may be located at any place. The plurality of users 102 may be located in any indoor location. In an example, the indoor location includes home, office, factory and the like. The plurality of users 102 may be located at any outdoor location. In an example, the outdoor location includes a mall, an amusement park, an airport and the like.

The plurality of communication devices 104 are associated with the plurality of users 102. In addition, the plurality of users 102 perform the one or more tasks using the plurality of communication devices 104. In an embodiment of the present disclosure, the plurality of communication devices 104 are portable devices. The plurality of communication devices 104 include but may not be limited to a smartphone, a laptop, a tablet and a personal assistant. In an example, the smartphone may be an Apple smartphone, an Android smartphone, a Windows smartphone and the like. In another embodiment of the present disclosure, In an embodiment of the present disclosure, the plurality of communication devices 104 are fixed communication devices. In an example, the fixed communication devices include a desktop, a workstation PC and the like. The plurality of communication devices 104 run on an operating system. In general, operating system provides an interface for the plurality of users 102 to interact with hardware of each of the plurality of communication devices 104 and other connected devices. In an example, the operating system installed in the plurality of communication devices 104. The plurality of communication devices 104 are working on Windows based operating system. In another example, the operating system installed in the plurality of communication devices 104. The plurality of communication devices 104 are working on Mac based operating system. In another embodiment of the present disclosure, the operating system installed in the communication device is a Linux based operating system.

In an example, the operating system installed in the plurality of communication devices 104 is a mobile operating system. In another example, the mobile operating system includes but may not be limited to Android operating system, Apple iOS, Symbian based operating system, BADA operating system and blackberry operating system. In addition, the plurality of communication devices 104 are working accurately in real time.

In an embodiment of the present disclosure, the plurality of communication devices 104 are internet enabled devices. Further, the plurality of communication devices 104 are connected to the communication network 108.

The communication network 108 acts as a medium for the plurality of communication devices 104 to connect to the one or more social media channel 106. The communication network 108 provides network connectivity to the plurality of communication devices 104 using a plurality of methods. The plurality of methods include 2G, 3G, 4G, Wi-fi, and the like. In an example, the communication network 108 includes but may not be limited to a local area network, a metropolitan area network, a wide area network, a virtual private network, a global area network and a home area network.

In an embodiment of the present disclosure, the plurality of communication devices 104 access data over the communication network 108 by utilizing one or more applications. The one or more applications include but may not be limited to a web browser, a mobile application, a widget and web applets. In general, each of the one or more applications have a graphical user interface. In general, the graphical user interface is known as GUI. The graphical user interface is designed to display and fetch data from a designated server. In addition, the graphical user interface provides the plurality of users 102 an interface for real time. The graphical user interface allows the plurality of users 102 to stream, upload and download data. In addition, the web browser is installed in the plurality of communication devices 104. In an example, the web browser includes Google Chrome, Mozilla Firefox, Opera, UC Web, Safari, Internet Explorer and the like.

The plurality of users 102 utilize the plurality of communication devices 104 to access the one or more social media channel 106. In general, social media channel is a web based technology that enables development, deployment and management of social media website and services. The one or more social media channel 106 provides ability to the plurality of users 102 to create an account on social media website and utilize services with complete social media network functionality. In addition, the one or more social media channel 106 is used to distribute huge amount of information that includes text, graphics, audio, video and the like. In an example, the one or more social media channel 106 include You Tube, Facebook, Twitter, Instagram, Pinterest, Snapchat, Vimeo and the like. The one or more social media channel 106 are used to display content. In an example, the content includes pictures, videos, audio, animations, GIF and the like.

The interactive computing environment 100 includes the video segmentation system 114. In an embodiment of the present disclosure, the video segmentation system 114 receives one or more content in one or more input formats in real time. The one or more input formats include a video, a text, an audio and the like. In another embodiment of the present disclosure, the one or more content in the one or more input formats are received from the one or more content source 110 in real time. The one or more content source 110 includes You Tube, Netflix, Amazon Prime, Hot star, Popcorn Flix and the like. In yet another embodiment of the present disclosure, the one or more content in the one or more input formats are received from the one or more content source 110 using the one or more input devices 112 in real time. The one or more input devices 112 include mouse, scanner, digital camera, joystick, keyboard, microphone, digitizer, light pen and the like.

The one or more content source 110 is associated with one or more database. In addition, the one or more database include MySQL database, Netflix media database, Amazon Web Services and the like. In an example, YouTube utilizes MySQL database to store all metadata available on YouTube. The metadata on MySQL database includes video data, audio data and the like. In addition, MySQL database is an open source relational database that enables You Tube to store metadata. Further, MySQL database allows a user to access the metadata of YouTube using a communication network as a medium. In another example, Netflix utilizes Netflix media database to store all metadata available on Netflix. The metadata on Netflix media database includes video data, audio data and the like. In another example, Amazon Prime utilizes Amazon Web Services as the database for Amazon Prime to store metadata available on Amazon Prime. The metadata on Amazon Web Services includes audio data, video data and the like.

The video segmentation system 114 performs segmentation of the one or more content received from the one or more content source 110 in real time. In general, segmentation divides an object into small parts and sections. In addition, the video segmentation system 114 segments the one or more content in one or more segments in real time. The one or more segments include shots, scenes, snaps and the like. In an embodiment of the present disclosure, the video segmentation system 114 segments the one or more content from the one or more content source 110 based on one or more parameters. The one or more parameters include intersection of audio continuity and video continuity, audio continuity and video continuity.

In addition, intersection of audio continuity and video continuity refers to seamless intersection of an audio content with respective video content. In an example, the video segmentation system 114 receives a video content. The video content has running length of 100 seconds. The video segmentation system 114 segments the video in 10 segments of 10 seconds each. Further, the video segmentation system 114 segments the video content based on intersection that checks the continuity of audio with respect to continuity of video. In addition, audio continuity refers to checking of continuity in an audio content present in the one or more segments. In an example, the video segmentation system 114 receives an audio content. The audio content has running length of 120 seconds. The video segmentation system 114 segments the audio content in 6 segments of 20 second each. Further, the video segmentation system 114 segments the audio content based on continuous audio. In addition, video continuity refers to checking of continuity in a video content present in the one or more segments. In an example, the video segmentation system 114 receives a visual content. The video segmentation system 114 segments the visual content based on continuity of visuals.

In an embodiment of the present disclosure, the video segmentation system 114 performs segmentation of the one or more content using one or more artificial intelligence algorithms. In general, artificial intelligence is an area of computer science and technology that emphasizes the creation of intelligent machines that work and react like humans. Further, artificial intelligence includes one or more artificial intelligence models. The one or more artificial intelligence models include reactive machine artificial intelligence, limited memory artificial intelligence, artificial narrow intelligence, artificial superhuman intelligence, artificial general intelligence and the like.

In an embodiment of the present disclosure, the video segmentation system 114 performs segmentation of one or more content using one or more machine learning algorithms. In general, machine learning is an application of artificial intelligence that provides system the ability to learn and improve automatically from experience without being explicitly programmed. In addition, the machine learning focuses on the development of computer programs that can access data and learn from data by itself. Further, the machine learning system is trained using three methods. The three methods of training of the machine learning system includes supervised learning, unsupervised learning, and reinforcement learning. In an example, the machine learning algorithms in supervised learning includes Linear regression for regression problems, Logistic regression, Decision tree, Naïve bayes' classification, Support vector machines for classification problems, Random forest for classification and regression problems and the like. In another example, the machine learning algorithms in unsupervised learning includes K-means algorithm, Principal component analysis, Independent component analysis and the like. In another example, the machine learning algorithms in reinforcement learning include q-learning algorithm, markov decision process, partially observable markov decision process and the like.

Further, the video segmentation system 114 performs ranking of the one or more segments in real time. The video segmentation system 114 performs ranking based on the segmentation of the one or more content. The video segmentation system 114 performs ranking of the one or more segments based on the one or more parameters. The one or more parameters include intersection of audio continuity and video continuity, audio continuity and video continuity. In general, ranking is a position in a hierarchy or scale. In an example, the video segmentation system 114 receives a video content that has running length of 1 minute. The video segmentation system 114 segments the video content in 6 segments 10 second each. Further the video segmentation system 114 ranks the 6 segments based on intersection of audio continuity and video continuity, audio continuity and video continuity. In another example, the video segmentation system 114 receives an audio content that has running duration of 2 minutes. The video segmentation system 114 segments the audio content in 10 segments of 12 seconds each. Further the video segmentation system 114 ranks the 10 segments based on audio continuity.

In an embodiment of the present disclosure, the video segmentation system 114 performs merging. In addition, the video segmentation system 114 performs merging of the one or more segments with highest ranking to produce an output content. In another embodiment of the present disclosure the video segmentation system 114 publishes the output content over the one or more social media channel 106. In addition, the video segmentation system 114 use the communication network to 108 publish the output content over the one or more social media channel 106. Further, the output content is displayed over the one or more social media channel 106 based on one or more requirements. The one or more requirements of the one or more social media channel 106 include orientation of the one or more social media channel 106, aspect ratio of the one or more social media channel 106, running time or duration of the output content on the one or more social media channel 106.

In general, orientation is a way in which a video is displayed on the screen of the communication device. The orientation includes portrait display of the content and landscape display of the content. In an embodiment of the present disclosure, the video segmentation system 114 transforms the one or more segments from horizontal view to portrait view and vice versa. In addition, the video segmentation system 114 enables the one or more segments to adapt transformation in real time. In an example, Facebook displays the content in landscape view and portrait view. In another example, WhatsApp displays the content in landscape view and portrait view. In yet another example, Snapchat displays the content in the content only in portrait view. In yet another example, Instagram displays the content in portrait view. In yet another example, YouTube displays the content in landscape view and in portrait view. In yet another example, LinkedIn displays the content in portrait view.

In addition, the aspect ratio is the ratio of width to height of any content. The content includes but may not be limited to any image, video and animation. In an embodiment of the present disclosure, the video segmentation system 114 enables the one or more segments to adapt transformations based on the aspect ratio associated with the plurality of communication devices 104 and the aspect ratio associated with the one or more social media channel 106. In addition, the aspect ratio associated with the plurality of communication devices 104 are different. In addition, the video segmentation system 114 creates the one or more segments based on different aspect ratio associated with the plurality of communication devices 104.

In an example, aspect ratio of Facebook to display the content in portrait view is 16:9. In another example, aspect ratio of Facebook to display the content in landscape view is 4:3. In yet another example, aspect ratio of WhatsApp to display the content in portrait view is 16:9. In yet another example, aspect ratio of WhatsApp to display the content in landscape view is 4:3. In yet another example, the aspect ratio of YouTube to display the content in portrait view is 16:9. In yet another example, the aspect ratio of YouTube to display the content in landscape view is 4:3. In yet another example, the aspect ratio of Instagram to display the content is 1:1. In yet another example, the aspect ratio of Snapchat to display the content is 9:16. In yet another example, the aspect ratio of LinkedIn to display the content is 1.91:1. In yet another example, the video segmentation system 114 creates the one or more segments of the one or more content for tablets, smartphones, laptops and personal desktops. In yet another example, the video segmentation system 114 creates 10 segments of a video of length 100 seconds. In addition, the video segmentation system 114 creates segments for Instagram having aspect ratio of 1:1. In addition, the video segmentation system 114 creates 10 segments for same video of length 100 seconds for Snapchat having aspect ratio 9:16.

Further, duration is time-span for which a segment is running on the social media channel 106. In an embodiment of the present disclosure, the video segmentation system 114 segments the one or more content based on duration of the one or more social media channel 106. In addition, duration is pre-defined for the one or more social media channel 106. In an example, Facebook displays the content for 20 seconds. In another example, WhatsApp displays the content for 30 seconds. In yet another example, Snapchat displays the content for 10 seconds. In yet another example, Instagram displays the content for 59 seconds. In yet another example, LinkedIn displays the content that has minimum running length of 3 seconds. In yet another example, a video is having length of 120 seconds. In addition, the video segmentation system 114 segments the video into 12 segments of 10 seconds each in length for Snapchat. In addition, the video segmentation system 114 segments same video of length 120 seconds into 2 segments of 60 seconds each for Instagram. In addition, the video segmentation system 114 segments the same video of length 120 seconds into 4 segments of 30 seconds each for WhatsApp.

In an embodiment of the present disclosure, the video segmentation system 114 segments the one or more content into one more video formats. In another embodiment of the present disclosure, the video segmentation system 114 creates the one or more segments into the one or more video formats. In an example, the one or more video formats include 3G2 format, 3GP format, AVI format, FLV format, MOV format, MP4 format, MPEG-2 format and the like.

In an embodiment of the present disclosure, the video segmentation system 114 performs scaling. In general, scaling is change in size of the video exactly to given height and width without necessarily retaining original height and width. In an example, the video segmentation system 114 is able to crop the size of the one or more content.

In an embodiment of the present disclosure, the video segmentation system 114 is able to compress a file containing the one or more content. In addition, the video segmentation system 114 is able to compress the file by reducing quality of content present in the file. In an example, a video file is having a video content of high definition quality with 2 GB of disk size. In addition, the video segmentation system 114 is able to reduce disk size of the video file by reducing quality of the video file.

In an embodiment of the present disclosure, the video segmentation system 114 performs content filtering of the one or more segments before publishing the one or more segments over the one or more social media channel 106. The content filtering of the one or more segments is done based on plurality of parameters. The plurality of parameters include location, adult content, visibility of skin and the like. In general, content filtering is a process of eliminating unwanted content from the existing content that might be harmful if opened or accessed. In an example, a user X lives in an American Native. The user X access television to watch channel XY. The channel XY is a sports channel. The channel XY will telecast sports that are popular in America like Baseball, Soccer, Rugby, Ice hockey, Basketball. In another example, a user A is an Indian citizen. The user AB accesses online music application in an electronic. The online music application will provide music that are trending in India to the user AB based on location and language of the user A. In another example, a user ABC is an Italian Native. The user AB is ordering food online. The user AB is getting the suggestions of Italian food. In another example, a user Suresh is living in Delhi. The user Suresh is ordering food online. The user Suresh is getting suggestions of North Indian food.

In an embodiment of the present disclosure, the video segmentation system 114 displays the output content over the one or more social media channel 106. In addition, the output content is displayed over the one or more social media channel 106 for marketing purpose. In general, marketing is an action or business of promoting and selling products or services including market research and advertising. In addition, advertising of the output content on the one or more social media channel 106 is done in order to gather the plurality of users 102 available on the one or more social media channel 106. In general, social media marketing is becoming more popular for both practitioners and researchers. In addition, the one or more social media channel 106 allow individuals, businesses and other organizations to interact with one another and build relationships between different communities online. In an example, Facebook enables users to do business like sale and purchase of products and services. In another example, Instagram enables users to create a business account and manage their business by exchange of products and services. In yet another example, WhatsApp has a customer base of 1 billion people in over 180 countries. In addition, WhatsApp is used to send personalized promotional messages to customers.

The interactive computing environment 100 includes the server 116. In an embodiment of the present disclosure, the video segmentation system 114 is connected with the server 116. In another embodiment of the present disclosure, the server 116 is part of the video segmentation system 114. The server 116 handles each operation and task performed by the video segmentation system 114. The server 116 stores the one or more instructions and the one or more processes for performing various operations of the video segmentation system 114. In an embodiment of the present disclosure, the server 116 is a cloud server. The cloud server is built, hosted and delivered through a cloud computing platform. In general, cloud computing is a process of using remote network server that are hosted on the internet to store, manage, and process data. Further, the server 116 includes the database 118.

The interactive computing environment 100 includes the database 118. The database 118 is used for storage purposes. The database 118 is associated with the server 116. In general, database is a collection of information that is organized so that it can be easily accessed, managed and updated. In an embodiment of the present disclosure, the database 118 provides storage location to all data and information required by the video segmentation system 114. In an embodiment of the present disclosure, the database 118 may be at least one of hierarchical database, network database, relational database, object-oriented database and the like. However, the database 118 is not limited to the above mentioned databases.

Figure 2:
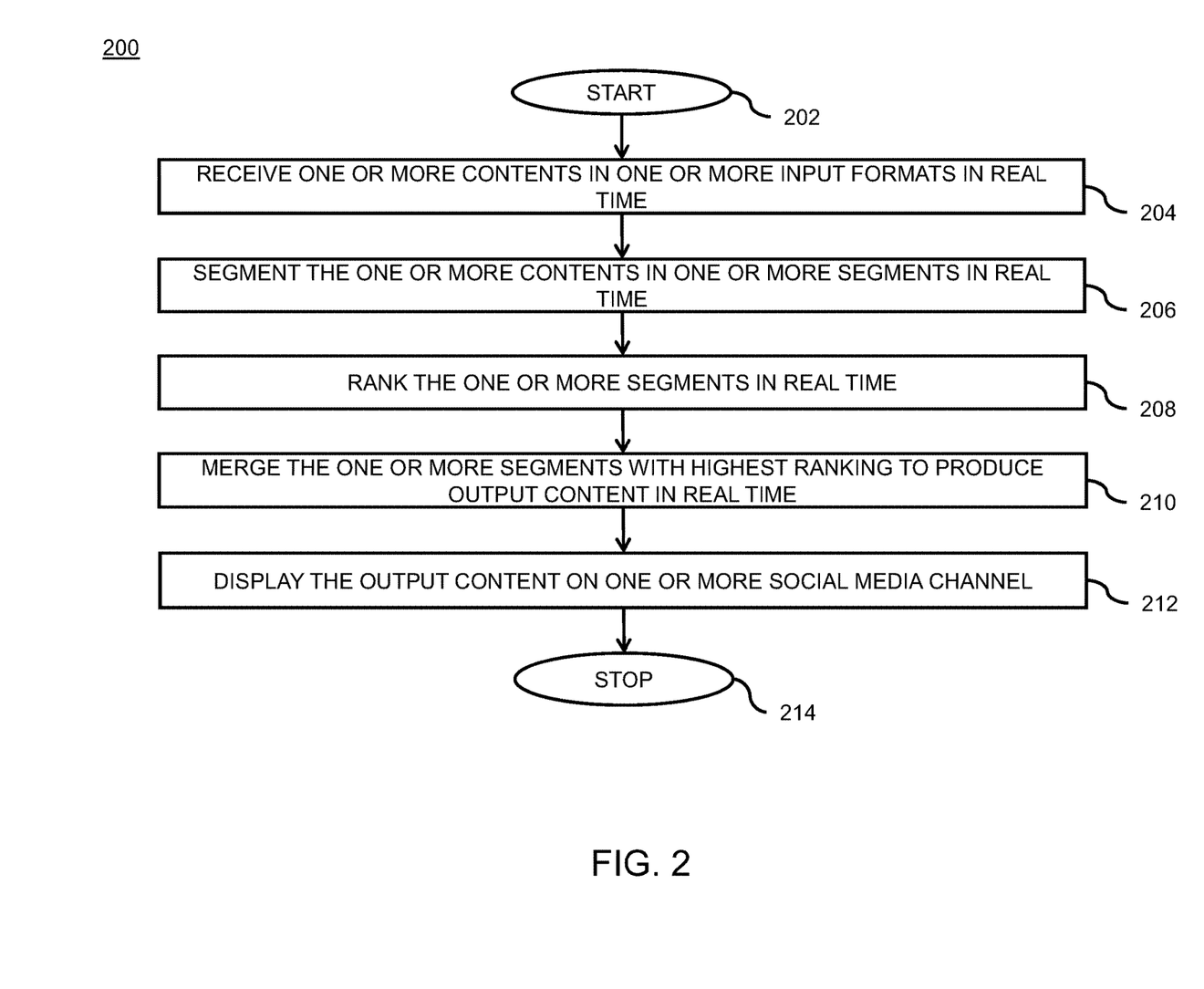
FIG. 2 illustrates a flow chart of a video segmentation system, in accordance with various embodiments of the present disclosure.

FIG. 2 illustrates a flow chart of a video segmentation system, in accordance with various embodiments of the present disclosure. It may be noted that to explain the process steps of flowchart 200, references will be made to the system elements of FIG. 1. It may also be noted that the flowchart 200 may have lesser or more number of steps.

The flow chart 200 initiates at step 202. Following step 202, at step 204, the video segmentation system 114 receives the one or more content in the one or more input formats in real time. Following step 204, at step 206, the video segmentation system 114 segments the one or more content in the one or more segments in real time. Following step 206, at step 208, the video segmentation system 114 ranks the one or more segments in real time. Following step 208, at step 210, the video segmentation system 114 merges the one or more segments with highest ranking to produce the output content in real time. Following step 210, at step 212, the video segmentation system 114 display the output content on the one or more social media channel 106 so as to gather the plurality of users 102 for marketing purpose and business purpose.

The flow chart 200 terminates at step 214. It may be noted that the flowchart 200 is explained to have above stated process steps; however, those skilled in the art would appreciate that the flowchart 200 may have more/less number of process steps which may enable all the above stated embodiments of the present disclosure.

Figure 3:
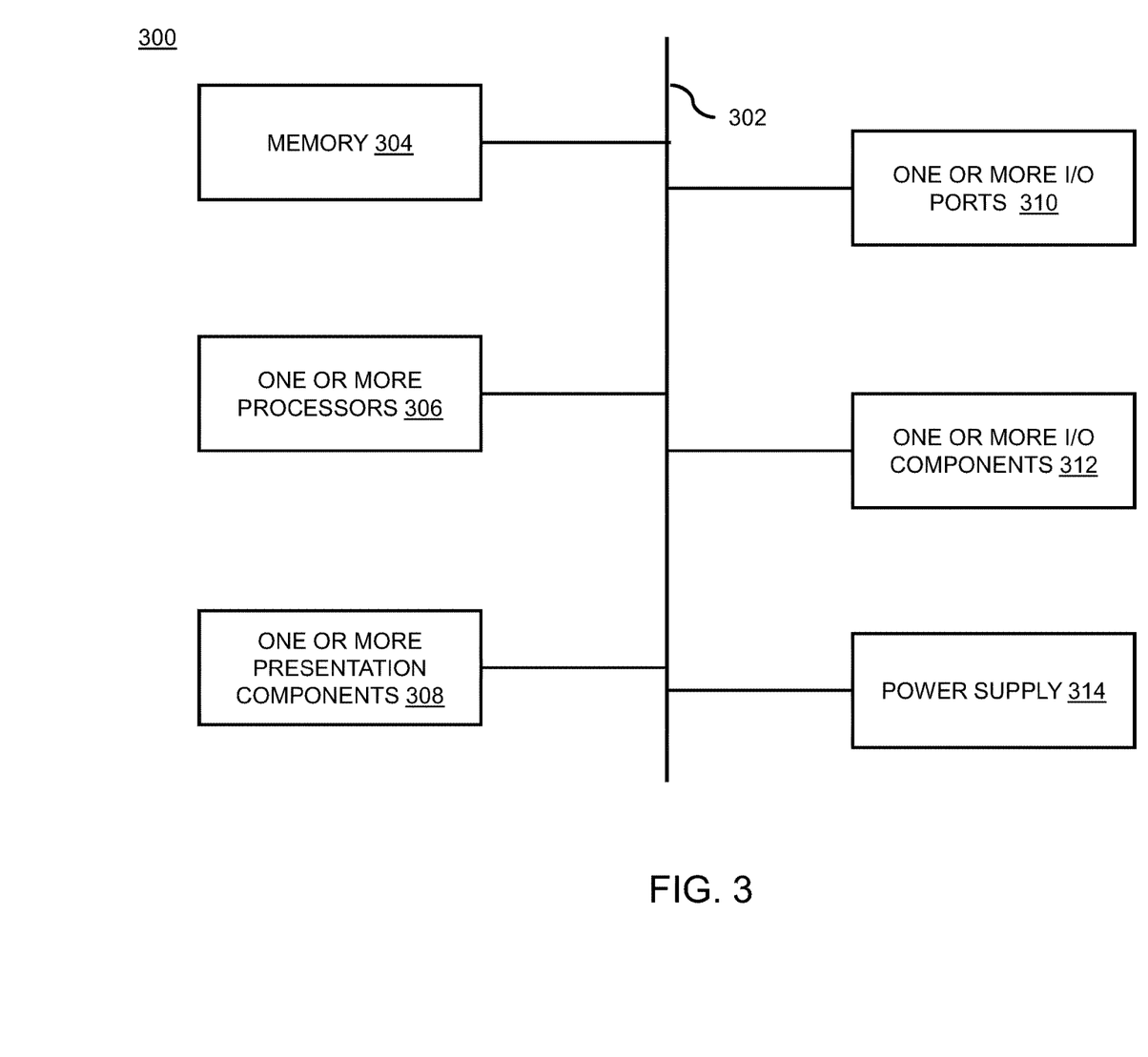
FIG. 3 illustrates a block diagram of a computing device, in accordance with various embodiments of the present disclosure.

FIG. 3 illustrates a block diagram of a computing device 300, in accordance with various embodiments of the present disclosure. In an embodiment of the present disclosure, the computing device 300 illustrates hardware elements of each communication device of the plurality of communication devices 104. The computing device 300 includes a bus 302 that directly or indirectly couples the following devices: memory 304, one or more processors 206, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any system or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device and the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed:

1. A computer-implemented method for creating one or more video segments of one or more content for display on one or more social media channel in real time, the method comprising:

receiving, at a video segmentation system with a processor, one or more video based content in one or more input formats, wherein the one or more video based content is received from one or more content source using one or more input devices in real-time;

analyzing, at the video segmentation system with the processor, the one or more video based content received from the one or more content source based on one or more parameters, wherein the one or more parameters comprising audio continuity, video continuity and an intersection of audio continuity and video continuity;

segmenting, at the video segmentation system with the processor, the one or more video based content in one or more video segments in real-time, wherein the one or more video based content is segmented into the one or more video segments based on the one or more parameters;

ranking, at the video segmentation system with the processor, the one or more video segments in real time, wherein the ranking of the one or more segments is based on segmentation of the one or more video based content, wherein the ranking is adaptive in nature; and merging, at the video segmentation system with the processor, the one or more segments with highest ranking to produce an output content, wherein the one or more segments are merged based on one or more requirements of one or more social media channel, wherein the output content is merged for displaying on the one or more social media channel.

2. The computer-implemented method as recited in claim 1, wherein the one or more input formats comprising at least one of text, audio, video, animation and GIF.

3. The computer-implemented method as recited in claim 1, wherein the one or more input devices comprising at least one of keyboard, mouse, scanner, digital camera, microphone, digitizer and a joystick.

4. The computer-implemented method as recited in claim 1, wherein the segmentation of the one or more segments is performed based on one or more algorithms, wherein the one or more algorithms comprising at least one of an artificial intelligence algorithm and a machine learning algorithm.

5. The computer-implemented method as recited in claim 1, wherein the ranking of the one or more segments is based on the one or more parameters, wherein the one or more parameters comprising the intersection of the audio continuity and video continuity, the audio continuity and the video continuity.

6. The computer-implemented method as recited in claim 1, wherein the audio continuity refers to checking of continuity in an audio content present in the one or more segments.

7. The computer-implemented method as recited in claim 1, wherein the video continuity refers to checking of continuity in a video content present in the one or more segments.

8. The computer-implemented method as recited in claim 1, wherein the intersection of the audio continuity and the video continuity refers to seamless intersection of an audio content with respective video content, wherein the audio content and the respective video content is present in the one or more segments.

9. The computer-implemented method as recited in claim 1, wherein the one or more requirements of the one or more social media channel comprising at least one of an aspect ratio of the output content, an orientation of the output content and a duration of the output content.

10. The computer-implemented method as recited in claim 1, wherein the output content is displayed on the one or more social media channel, wherein the output content is displayed on the one or more social media channel for marketing purpose.

11. A computer system comprising:
one or more processors; and
a memory coupled to the one or more processors, the memory for storing instructions which, when executed by the one or more processors, cause the one or more processors to perform a method for creating one or more video segments of one or more content for display on one or more social media channel in real time, the method comprising:

receiving, at a video segmentation system, one or more video based content in one or more input formats, wherein the one or more video based content is received from one or more content source using one or more input devices in real-time;

analyzing, at the video segmentation system, the one or more video based content received from the one or more content source based on one or more parameters, wherein the one or more parameters comprising audio continuity, video continuity and an intersection of audio continuity and video continuity;

segmenting, at the video segmentation system, the one or more video based content in one or more video segments in real-time, wherein the one or more video based content is segmented into the one or more video segments based on the one or more parameters;

ranking, at the video segmentation system, the one or more video segments in real time, wherein the ranking of the one or more segments is based on segmentation of the one or more video based content, wherein the ranking is adaptive in nature; and merging, at the video segmentation system, the one or more segments with highest ranking to produce an output content, wherein the one or more segments are merged based on one or more requirements of one or more social media channel, wherein the output content is merged for displaying on the one or more social media channel.

12. The computer system as recited in claim 11, wherein the one or more input formats comprising at least one of text, audio, video, animation and GIF.

13. The computer system as recited in claim 11, wherein the one or more input devices comprising at least one of keyboard, mouse, scanner, digital camera, microphone, digitizer and a joystick.

14. The computer system as recited in claim 11, wherein the segmentation of the one or more segments is performed based on one or more algorithms, wherein the one or more algorithms comprising at least one of an artificial intelligence algorithm and a machine learning algorithm.

15. The computer system as recited in claim 11, wherein the ranking of the one or more segments is based on the one or more parameters, wherein the one or more parameters comprising the intersection of the audio continuity and video continuity, the audio continuity and the video continuity.

16. The computer system as recited in claim 11, wherein the audio continuity refers to checking of continuity in an audio content present in the one or more segments.

17. A non-transitory computer-readable storage medium encoding computer executable instructions that, when executed by at least one processor, performs a method for creating one or more video segments of one or more content for display on one or more social media channel in real time, the method comprising:

receiving, at a computing device, one or more video based content in one or more input formats, wherein the one or more video based content is received from one or more content source using one or more input devices in real-time;

analyzing, at the computing device, the one or more video based content received from the one or more content source based on one or more parameters, wherein the one or more parameters comprising audio continuity, video continuity and an intersection of audio continuity and video continuity;

segmenting, at the computing device, the one or more video based content in one or more video segments in real-time, wherein the one or more video based content is segmented into the one or more video segments based on the one or more parameters;

ranking, at the computing device, the one or more video segments in real time, wherein the ranking of the one or more segments is based on segmentation of the one or more video based content, wherein the ranking is adaptive in nature; and merging, at the computing device, the one or more segments with highest ranking to produce an output content, wherein the one or more segments are merged based on one or more requirements of one or more social media channel, wherein the output content is merged for displaying on the one or more social media channel.

18. The non-transitory computer-readable storage medium as recited in claim 17, wherein the segmentation of the one or more segments is performed based on one or more algorithms, wherein the one or more algorithms comprising at least one of an artificial intelligence algorithm and a machine learning algorithm.

19. The non-transitory computer-readable storage medium as recited in claim 17, wherein the ranking of the one or more segments is based on the one or more parameters, wherein the one or more parameters comprising the intersection of the audio continuity and video continuity, the audio continuity and the video continuity.

20. The non-transitory computer-readable storage medium as recited in claim 17, wherein the audio continuity refers to checking of continuity in an audio content present in the one or more segments.

* * * * *